United States Patent
Tschida et al.

[11] Patent Number: 6,161,933
[45] Date of Patent: Dec. 19, 2000

[54] DEVICE FOR CONTROLLING, REGULATING AND MONITORING A MOTION-PICTURE CAMERA

[75] Inventors: Ernst Tschida, Vienna; Michael Koppetz, Müchen; Walter Trauninger, Laabe im Walde, all of Germany

[73] Assignee: Arnold & Richter Cine Technik GmbH & Co. Betriebs KG, Munich, Germany

[21] Appl. No.: 09/214,768

[22] PCT Filed: Jul. 14, 1997

[86] PCT No.: PCT/DE97/01518

§ 371 Date: Jan. 11, 1999

§ 102(e) Date: Jan. 11, 1999

[87] PCT Pub. No.: WO98/02778

PCT Pub. Date: Jan. 22, 1998

[30] Foreign Application Priority Data

Jul. 12, 1996 [DE] Germany .................... 196 29 484

[51] Int. Cl.[7] .............. G03B 1/00; G03B 17/00; H04N 5/232
[52] U.S. Cl. .............. 352/179; 396/56; 348/211
[58] Field of Search .............. 352/178, 179, 352/131; 74/471, 469, 479.01; 396/48, 56, 57, 58, 59; 348/21, 211, 212, 213

[56] References Cited

U.S. PATENT DOCUMENTS

| | | | |
|---|---|---|---|
| 5,012,335 | 4/1991 | Cohodar | 358/108 |
| 5,014,080 | 5/1991 | Miyadera | 354/403 |
| 5,220,848 | 6/1993 | Basilico | 74/471 |
| 5,223,867 | 6/1993 | Nguyen-Nhu | 352/180 |
| 5,517,300 | 5/1996 | Parker et al. | 356/139.06 |
| 5,561,686 | 10/1996 | Kobayashi et al. | 375/200 |
| 5,666,159 | 9/1997 | Parulski et al. | 348/211 |
| 5,719,622 | 2/1998 | Conway | 348/211 |

FOREIGN PATENT DOCUMENTS

| | | |
|---|---|---|
| 574 105-A1 | 12/1993 | European Pat. Off. . |
| 42 20 129 A1 | 12/1993 | Germany . |
| 4-42673 | 2/1992 | Japan . |

OTHER PUBLICATIONS

Patent Abstracts of Japan, vol. 016, No. 227 (E–1207), May 26, 1999.

Primary Examiner—David M. Gray
Assistant Examiner—Rodney Fuller
Attorney, Agent, or Firm—Christie, Parker & Hale, LLP

[57] ABSTRACT

A device for controlling, regulating and monitoring a cine camera with a control and/or data detection unit which is connected to devices for controlling and/or detecting camera or recording functions, and connected to operating and control devices for controlling and monitoring camera and recording functions.

15 Claims, 11 Drawing Sheets

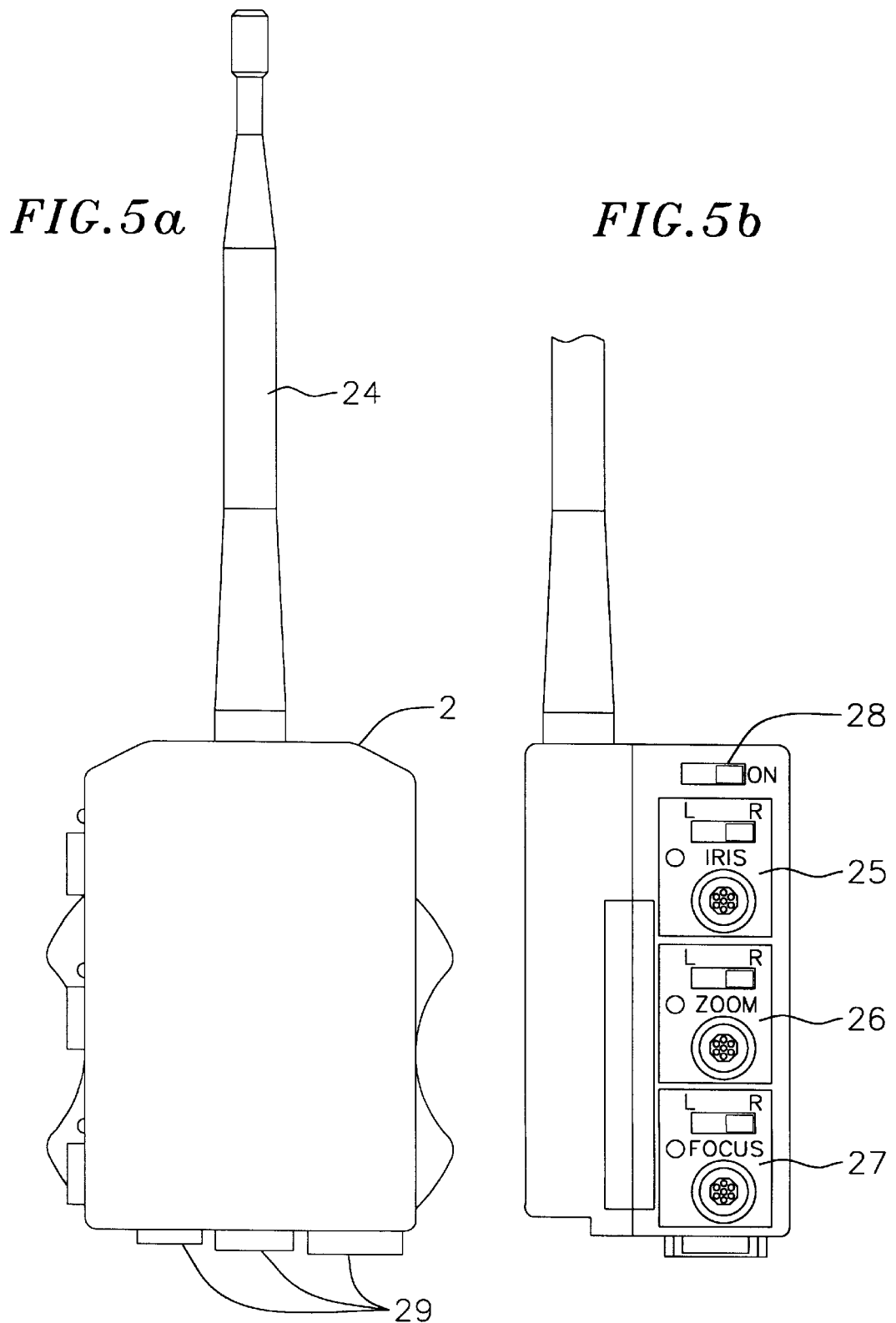

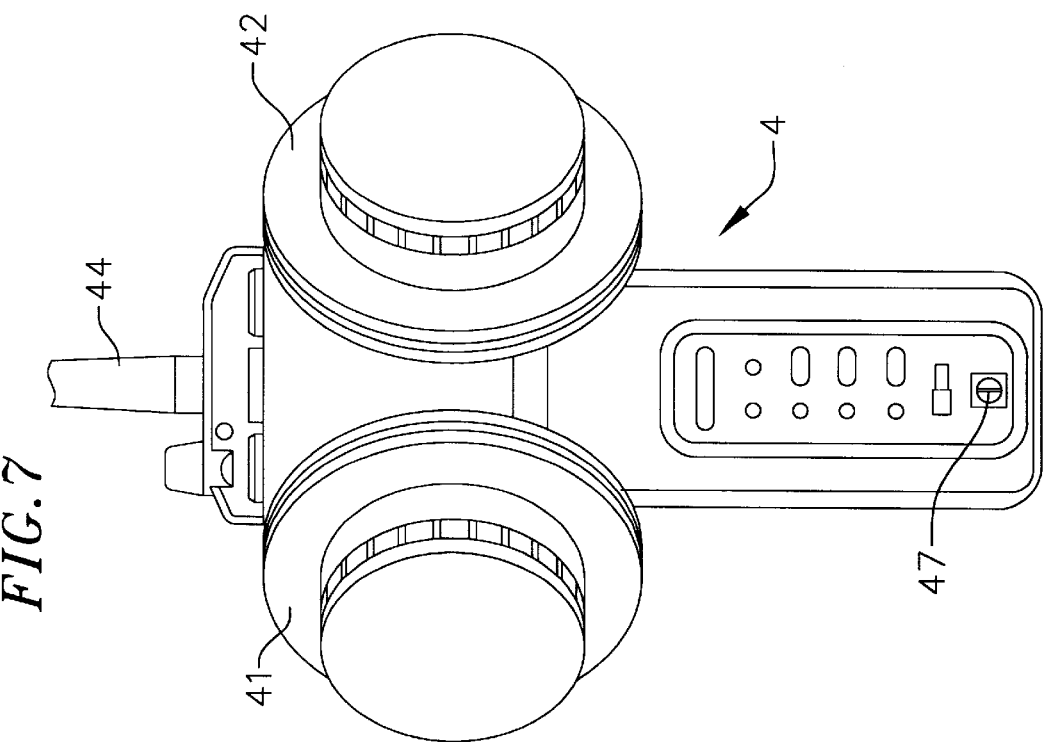
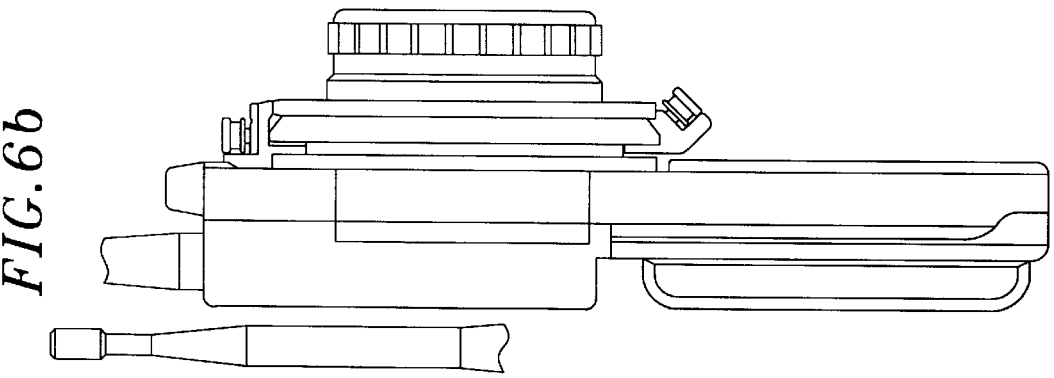
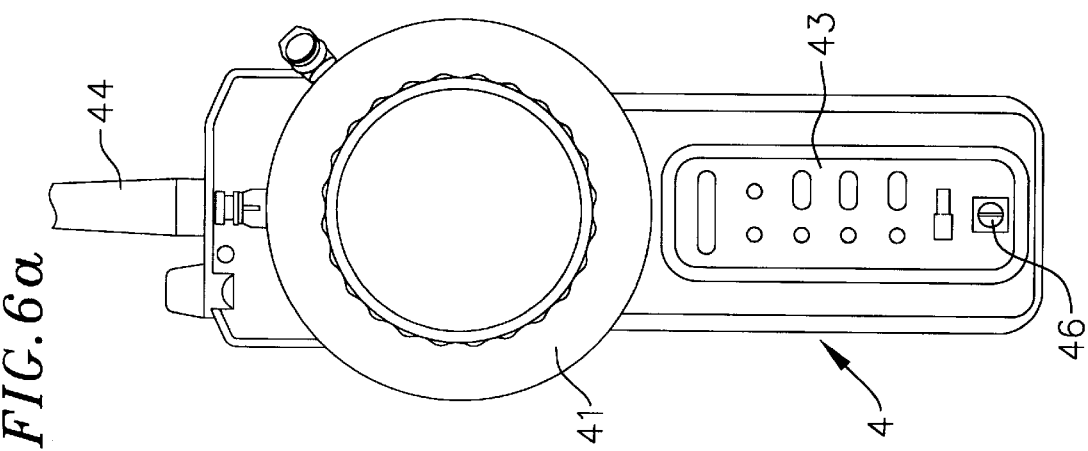

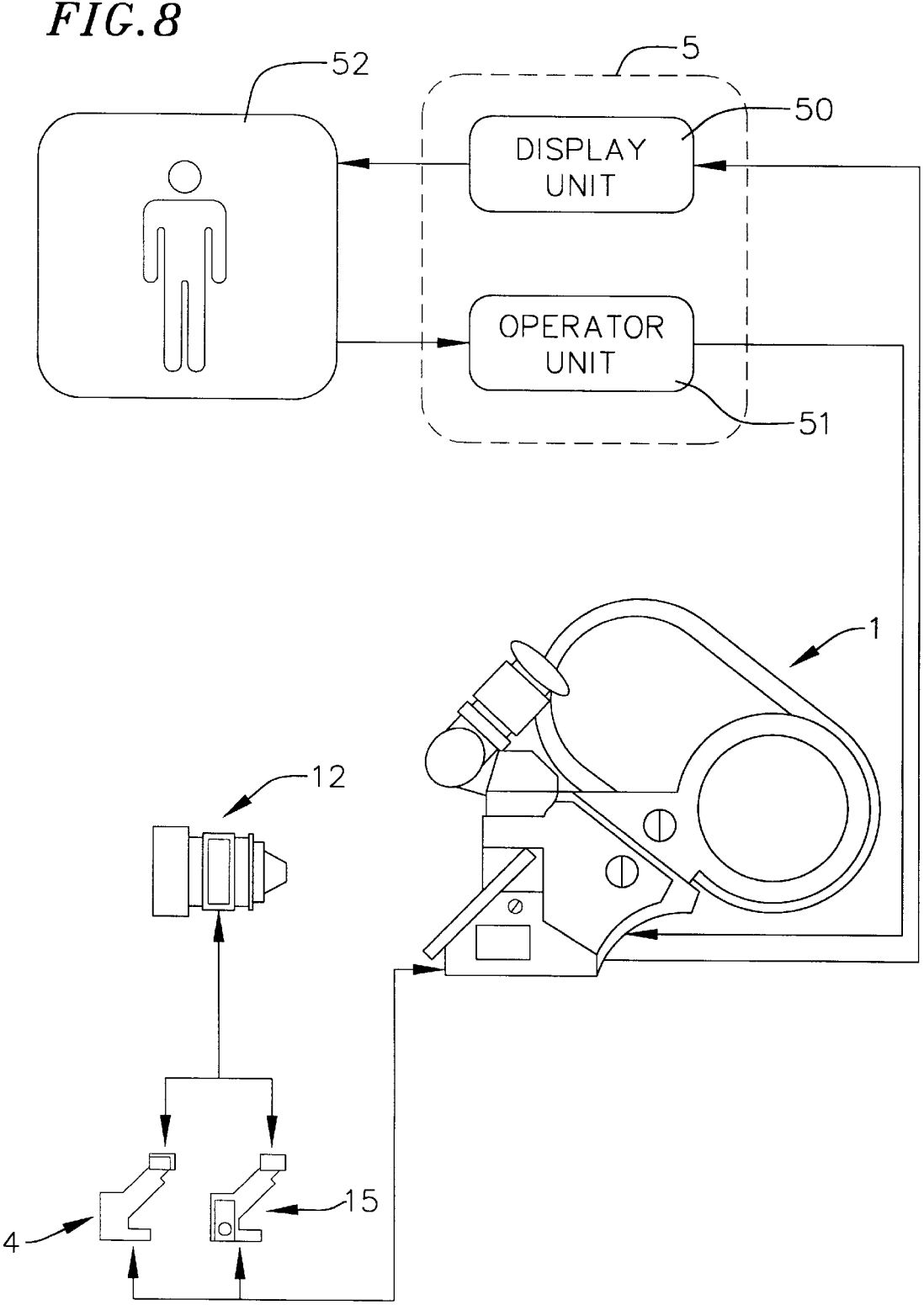

DEVICE FOR CONTROLLING, REGULATING AND MONITORING A MOTION-PICTURE CAMERA

FIELD OF THE INVENTION

The invention relates to a device for controlling, regulating and monitoring a motion-picture camera (a cine camera).

BACKGROUND OF THE INVENTION

In order to operate a cine camera a number of parameters have to be set and changed before and during recording, such as for example the recording frequency, the sector aperture opening, iris diaphragm opening, focus and focal length of the lens. Some of these parameters can be linked together by flow programs in order, for example, to maintain a constant depth of focus during a take despite different lighting conditions. To this end, the time curve of the change of both the recording frequency and of the sector opening is programmed and monitored by means of a camera control device. The camera control device furthermore monitors camera functions such as the co-ordination of the individual camera motors, the setting of the end-of-film pre-warning, the setting for reverse running, and the setting of time codes and user bits.

Setting the iris diaphragm opening, focus and focal length is undertaken on lens rings of the camera lens. For a simpler and more reliable setting of the camera lens it is preferred to use operating elements which are either attached to the camera itself or are formed as remote-control operations.

From EP A 574 105 a modular control system is known for a camera wherein the devices controlling and detecting the camera functions are connected by a control and data bus to a manual operating unit or to a main manual operating unit to which several secondary manual operating units can be attached. A remote control of the camera functions, listing of the camera functions and retrieval of stored or programmed settings and setting sequences is possible with this modular control system.

With this control system, certain camera functions such as zoom, focus and iris adjustment are undertaken in the individual manual operating unit or in the separate manual operating units which are however connected together by the main manual operation unit. A local separation of these operating functions is thereby not provided and, as a result of the connection of secondary units with a main unit, are only possible at a slight distance from each other. Monitoring, listing and data detection functions are likewise not provided by the known modular control system for a camera.

From JP 4-42673 A it is known to transfer control signals from an operator console to a camera by means of radio signals. This system does not however include the separation of the units on the operator side into several units associated with the different camera functions as well as into units associated with the different functions of controlling, monitoring and data detection.

In addition to these pure tasks for controlling the camera functions, further control and listing tasks relating to camera- and recording-specific data have to be carried out before and during film recording, such as listing the recording sequences, camera settings, picture sequences and exposed film lengths of a camera cassette. These administrative functions are undertaken by a number of different people and carried out at different locations. During film recordings and at the conclusion of film recordings, the data are collected, processed, re-used or registered for processing the film. Much of this data is used for memory functions in order, for example, to repeat certain camera settings or to revise film sequences, etc.

The administration of this amount of data is time-consuming and requires a high degree of precision as well as the adjustment of the running camera prior to a recording as well as renewing the parameters during a recording. This frequently causes collisions between the various operating people as well as time-consuming repetitions, new adjustments and changes of the recording parameters and camera settings.

Apart from the camera-specific control and monitoring functions, it is often necessary to control accessory devices and devices used for positioning and aligning the cine camera, such as the tripod head, camera trolley, lighting devices etc, and to monitor and make minute adjustments. Such control, monitoring and listing tasks are necessary for example for co-ordinating and synchronizing film sequences (takes) which are recorded separately from each other either in time and/or location. One example of this is linking natural recording sequences as well as recording sequences set up by computer-assisted, more particularly three-dimensional simulation and which have to be matched with each other both spatially and in time so that when linking the separately produced recording sequences, the impression is given of a real synchronized action development recorded under the same viewing angle.

In order to produce special effects of this kind, real scenes are recorded with a cine camera, where applicable, with the inclusion of actors and, independently of this, three-dimensional computer animations are produced where a virtual camera is moved, more particularly panned over the animation scenes. This requires that the virtual camera executes precisely, both spatially and in time, the same movement as the real camera. All the camera and recording-specific data, such as light/dark sector of the orbital aperture of the camera, the running speed of the camera, distance settings, recording angle, lens data must all agree.

If the corresponding film sequences agree then the original picture, the real filmed scenes, are scanned and the preferably three-dimensional computer animations are superimposed on the scanning sequence so that the mixed recording sequences can be transferred to a negative film by means of an exposure device.

The listing of all the camera- and accessory-specific data is extremely expensive, particularly if the settings of the camera and the accessory devices are carried out by different operating people at different locations and at different times. Apart from inaccuracies with the reproduction of the different adjustment parameters, recording and retrieving data is connected with high production costs and in many cases leads to a restriction on the artistic freedom of the director as well as the operating people entrusted with the individual adjustment tasks.

SUMMARY OF THE INVENTION

The object of the present invention is to guarantee a device for the control, monitoring and data detection of camera functions from various locations and by different operating persons with the lowest possible disruption to the control operation of the camera through the monitoring and data detection of camera functions and to allow a rapid connection of the operating and setting units, which can be configured in any way.

This invention is achieved by a control and/or data detection unit which is connected to devices for controlling and/or detecting camera or recording functions and connected to operating and control devices for controlling and monitoring the camera and recording functions.

The solution according to the invention allows a universal, reliable, simple, and networkable operation of a cine camera, its control from different locations with mobile units and thus any location change of the operating people independently of each other, a simplification of the administration functions, a more efficient film production with lower production costs and shorter production times, whilst retaining all the artistic freedoms for the director and the operating people involved in the recording sequences and computer animations, a rapid connection of the various operating and adjustment units which can be configured in any way as well as a simple picture-synchronized listing of all the data of the recorded film sequences which can be reproduced at any time.

Overall the solution according to the invention provides a freely configurable system wherein control, monitoring and data detection functions are separated spatially from each other. By splitting up the various functions of the control, monitoring and data detection, the local separation of the operating persons entrusted with these tasks becomes possible and thus the prerequisite for this is that these persons can each concentrate fully on the function falling within their task area of controlling, monitoring or detecting data relating to the camera or recording operation.

By uncoupling the individual functions of the control, monitoring and data detection, the important control operation for controlling the various camera functions is only minimally disturbed.

Furthermore, the solution provides a universal, simple, reliable, networkable remote control which is independent of location and without the need for a cable connection with the cine camera. The control of the cine camera as well as looking after the administration functions by listing recording- and camera-specific data can be carried out from any positions and even a change of location during the control and monitoring activity is possible without problem. Furthermore, it is possible to carry out a precise time coupling of camera slope functions with the adjustment of the lens setting and to fulfill memory functions.

Coupling different cine cameras, for example, for listing recording- and camera-specific data through networks, is also possible so that any loss of data is avoided, the film processing becomes easier and the reproduction of certain camera settings and recording situations is possible.

The control units on the operator side can also thereby be coupled to existing cable remote control units so that compatibility with the existing apparatus is ensured. The data security and resistance to breakdown is thereby guaranteed and a user-specific hierarchy, wherein certain priority rights are allocated to the users, which in the event of conflicting data, ensure data selection according to priority rights.

An advantageous development of the solution is that the control or data detection unit is connected to a device for producing and/or detecting film-fixed markings.

By linking all the camera and accessory specific data with film-fixed markings, recording-specific data, which can be reproduced at any time, are allocated to the film sequences to ensure an exact tie-up of real scenes, which are produced separately from each other, and computer-assisted three-dimensional animation scenes, with a reduced time and production expense.

BRIEF DESCRIPTION OF THE DRAWINGS

The idea underlying the invention will now be explained in further detail with reference to the embodiments shown in the drawings in which:

FIGS. 5a and 5b are a plan view and side view of a universal motor control unit, respectively;

FIGS. 6a and 6b are a plan view and side view of a radio control unit on the operator side, respectively;

FIG. 7 is a plan view of a combined radio control unit;

FIG. 8 is a diagrammatic signal flow chart for a camera lens system;

DETAILED DESCRIPTION OF THE PREFERRED EMBODIMENTS

Figure 1:
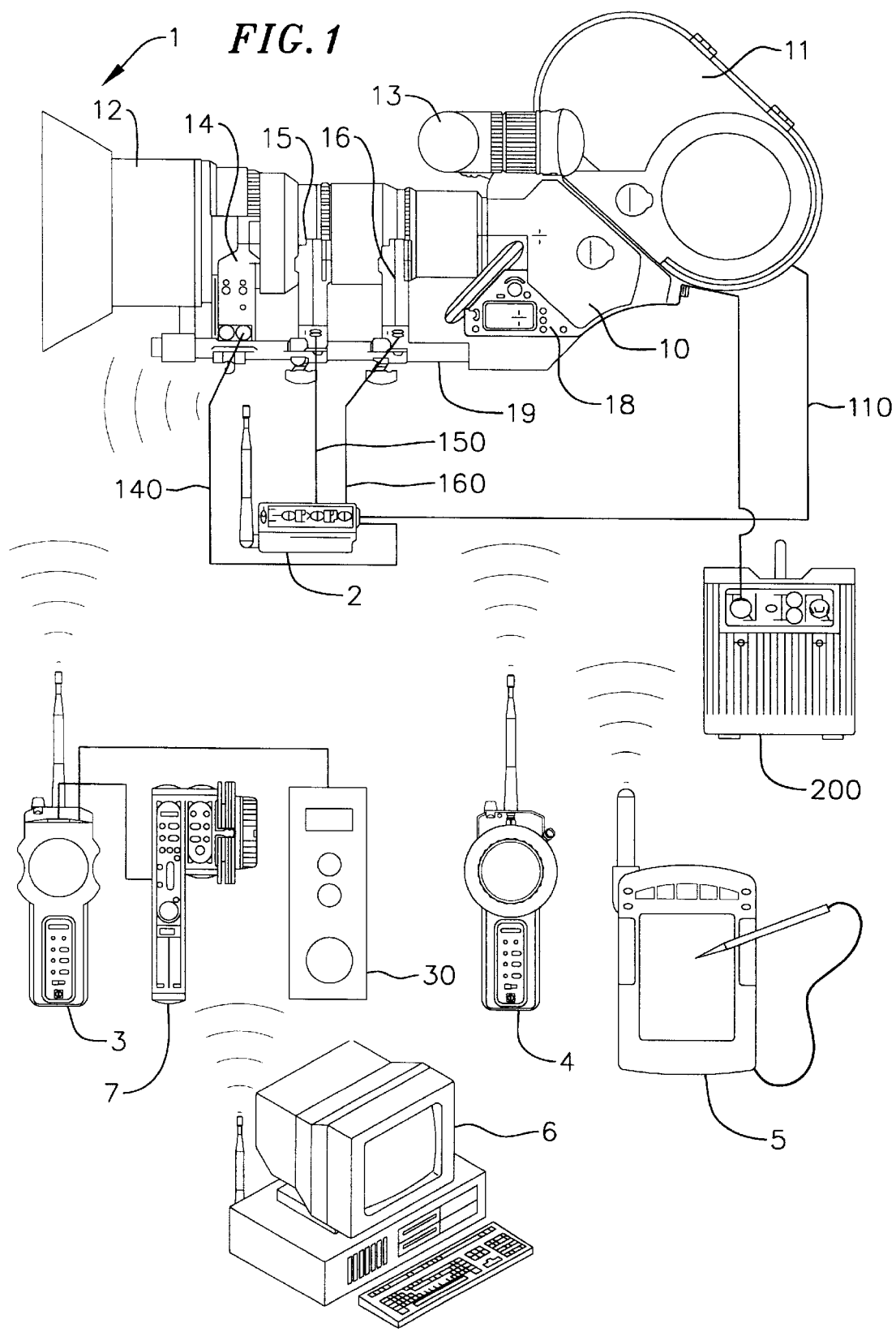
FIG. 1 is a diagrammatic block circuit diagram of a cine camera with several remote control and listing modules.
Figure 2:
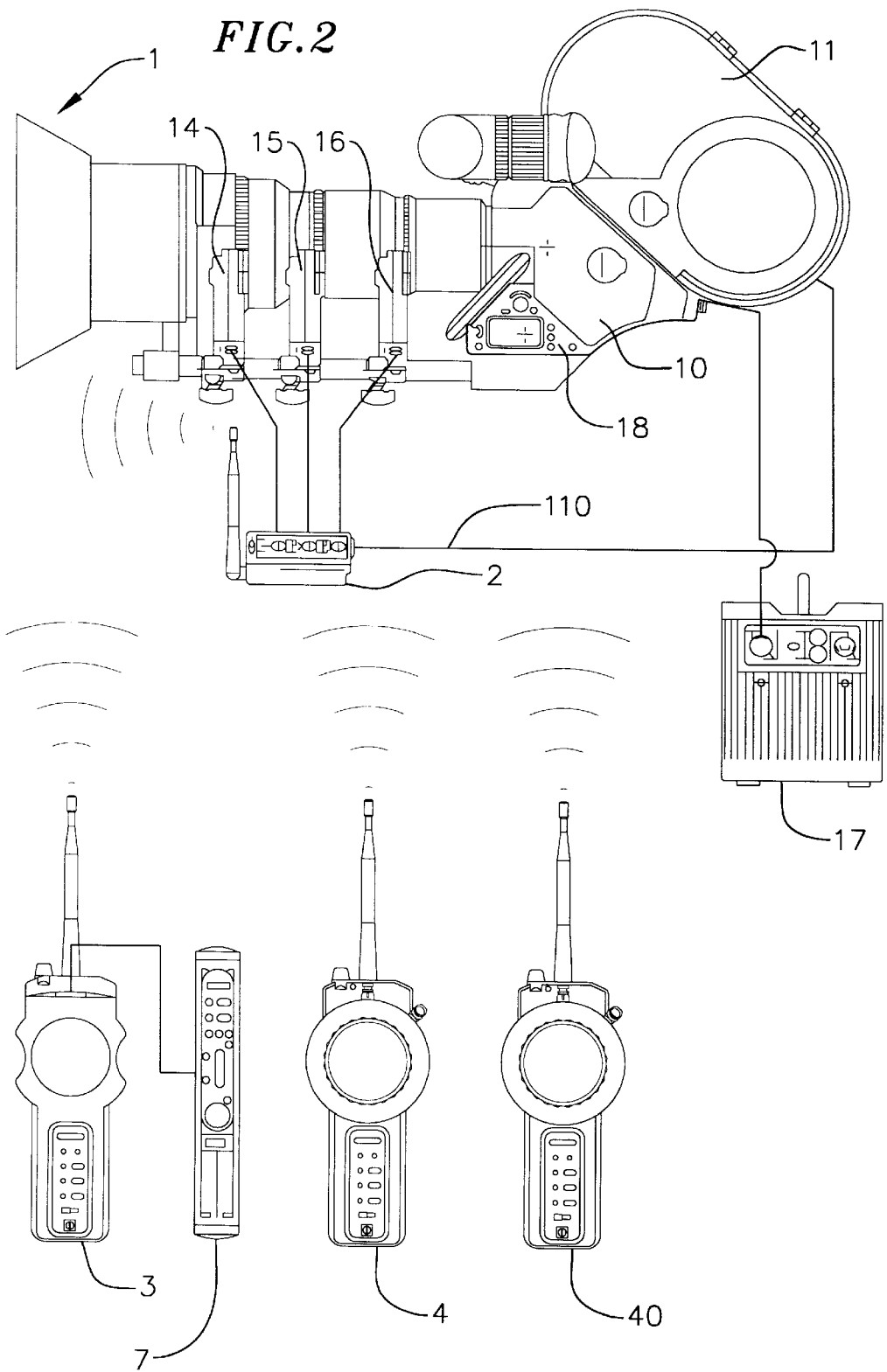
FIG. 2 is a diagrammatic block circuit diagram of a cine camera with three radio remote control modules and a cable manual operating unit.

FIGS. 1 and 2 show diagrammatically a control, regulating and monitoring system for a cine camera which, to improve mobility, allows a wireless control and monitoring of all the camera functions, but which can also be operated with wiring.

The cine camera 1 consists of a camera housing 10 with a camera mechanism mounted therein for transporting the moving film, a rotating aperture disc, and housing connections for the camera cassette 11, the camera lens 12 and camera viewfinder 13, as well as an operating field 18 for setting, storing and retrieving various camera functions. A focus drive unit 14, a zoom drive unit 15 and an iris drive unit 16, which are designed, for example, corresponding to the drive unit according to DE 42 20 129 A1, are mounted on two iris rods 19 which are connected to the camera housing 10. The power supply for the cine camera 1 is through a camera battery 200 which is mounted separately from the camera housing 10 or integrated in the camera housing 10.

The control, regulating and monitoring unit of the cine camera 1 is connected by a connecting lead 110 to a control and detection unit 2 on the camera side and the focus drive unit 14, zoom drive unit 15 and iris drive unit 16 are attached to the control and detection unit 2 by leads 140, 150 and 160. The control, regulating and monitoring unit of the cine camera 1 controls and monitors the different camera functions, such as transport speed of the moving film, setting of the reflex aperture, operating a video playback, etc., and controls and monitors data on the cassette side, such as the type of cassette, the length of exposed and unexposed film, etc.

The control and detection unit 2 on the camera side is designed optionally for radio or cable operation and is compatible with existing remote control units which are used for cable remote control. For radio operation the control and detection unit 2 on the camera side has a radio modem unit which serves as "radio access point" for a star-shaped radio network. It furthermore contains a micro processor for coupling the various component parts on the camera side with the radio modem unit for sending out and receiving control and monitoring signals.

The control and detection unit 2 of the camera 1 is connected to an interface for connecting the control and detection unit 2 to a BUS cable which is connected to the remote control and monitoring devices. For the cable operation of the control and detection unit 2 on the camera side, a cable is attached instead of the aerial or in the event of dispensing with the radio modem unit, the connection with the control units on the operator side is produced through a camera control BUS so that existing cable manual units can be connected directly to the control and detection unit 2 on the camera side while wireless remote control units are attached through a control BUS adapter.

A first operator-side control unit 3 is provided on the remote control side to which selectively cable remote control units 7, 30 can be attached and associated with the different camera and lens functions. Thus for example the remote control unit 7 can be used for zoom and iris control whilst the remote control unit 30 can be used for focus adjustment, and setting the transport speed. A second control unit 4 is provided for exclusive radio operation and can serve, for example, for the sole focus adjustment.

A third control unit 5 is designed as a "pen-based computer," i.e. as a hand terminal for data transfer. A hand terminal of this kind is suitable not only for the input of control commands, but more particularly for carrying out monitoring functions, i.e. for indicating and storing camera- and recording-specific data. This data can be coupled with additional information, for example the association of certain film sequences with the screenplay, or a film code for certain camera settings. A pen-based computer of this kind is offered for example by the firm of TELXON under their product reference PTC-1140 and has a display with 64 grey steps and a cable-less electromagnetic pen with which recordings can be made directly on the screen or functions can be selected from predetermined menus. The integrated radio module for cable-less data transfer uses the radio process Spread-Spectrum, MODACOM or ARDIS.

The power supply in radio operation is through batteries in the case of control units on the operator side and the power supply on the camera side is supplied through the connecting cable to the camera. A parallel operation of several transfer paths is possible and—as described above— several control units can maintain a connection with one camera unit (network operation) whereby cabling can be omitted when using several control units. In cable operation the battery can also be omitted because the power supply is supplied to the control unit through the cable connection from the side of the camera.

A work station 6 can also be incorporated into the radio network to allow the display, monitoring and listing of all the camera- and recording-specific data as well as the input of control commands, and to provide priorities of the control units on the operator side.

The radio connection between the control units 3, 4, 5 or the work station 6 on the operator side and the control and detection unit 2 on the camera side is produced by means of micro wave transceivers which use spread spectrum transmitting/receiving technology. Transmitters and receivers are combined in these transceivers and are equipped with a unitary interface with the apparatus parts on the camera side and on the operator side.

Alternatively, one of the several operator-controlled units 3, 4, 5, 6 contains the following: a LCS BUS adapter with a lens control system and camera control unit socket for attaching at least one remote control unit controlling the camera functions and for sending out BUS control signals and the microprocessor-supported controller for reforming the input control signals; a BUS control signals into a format suitable for radio transmission; and a modem module with a data modem with the matched connection to the microprocessor-supported controller.

In order to obtain a high data security, a special protocol with an automatic CRC check is used which together with the hardware technology is taken over by the radio LANs from computer technology. The apparatuses normally work in the frequency range of 2.4 to 2.5 GHz, which in many countries is released for unlicensed data transfer. This apparatus technology allows reliable user-friendly incorporation of control computers into the camera and lens control in connection with a camera-specific software driver.

FIG. 2 shows, in a modification of the arrangement according to FIG. 1, a network with a control and detection unit 2 on the camera side and three control units 3, 4, 40 on the operator side, of which the control unit 3 is additionally connected to a cable remote control unit 7 whose signals are converted by means of the radio modem of the control unit 3 into radio signals.

Figure 3:
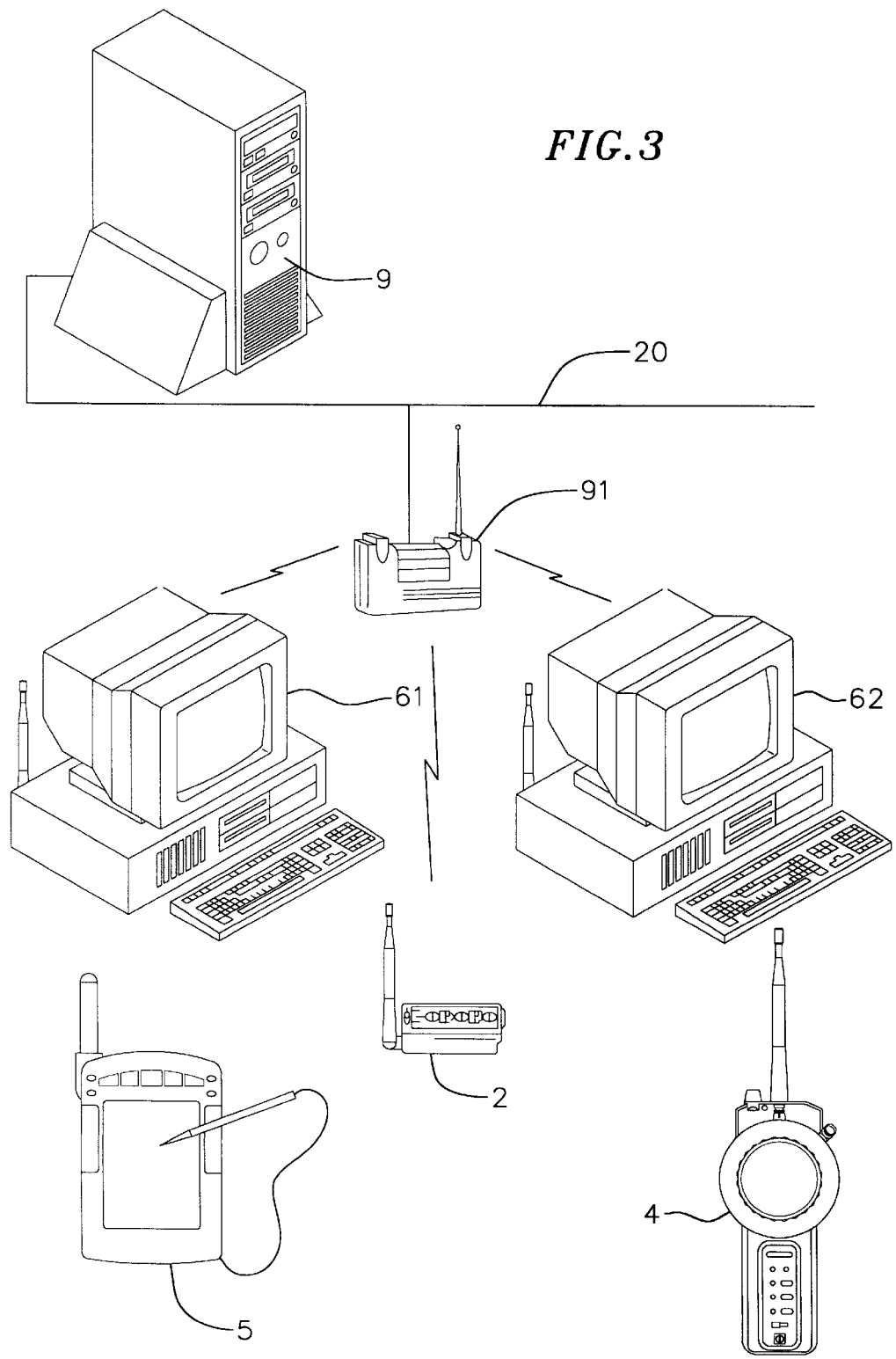
FIG. 3 shows a network construction with two micro computers and a file server which are connected together by an access transceiver.
Figure 4:
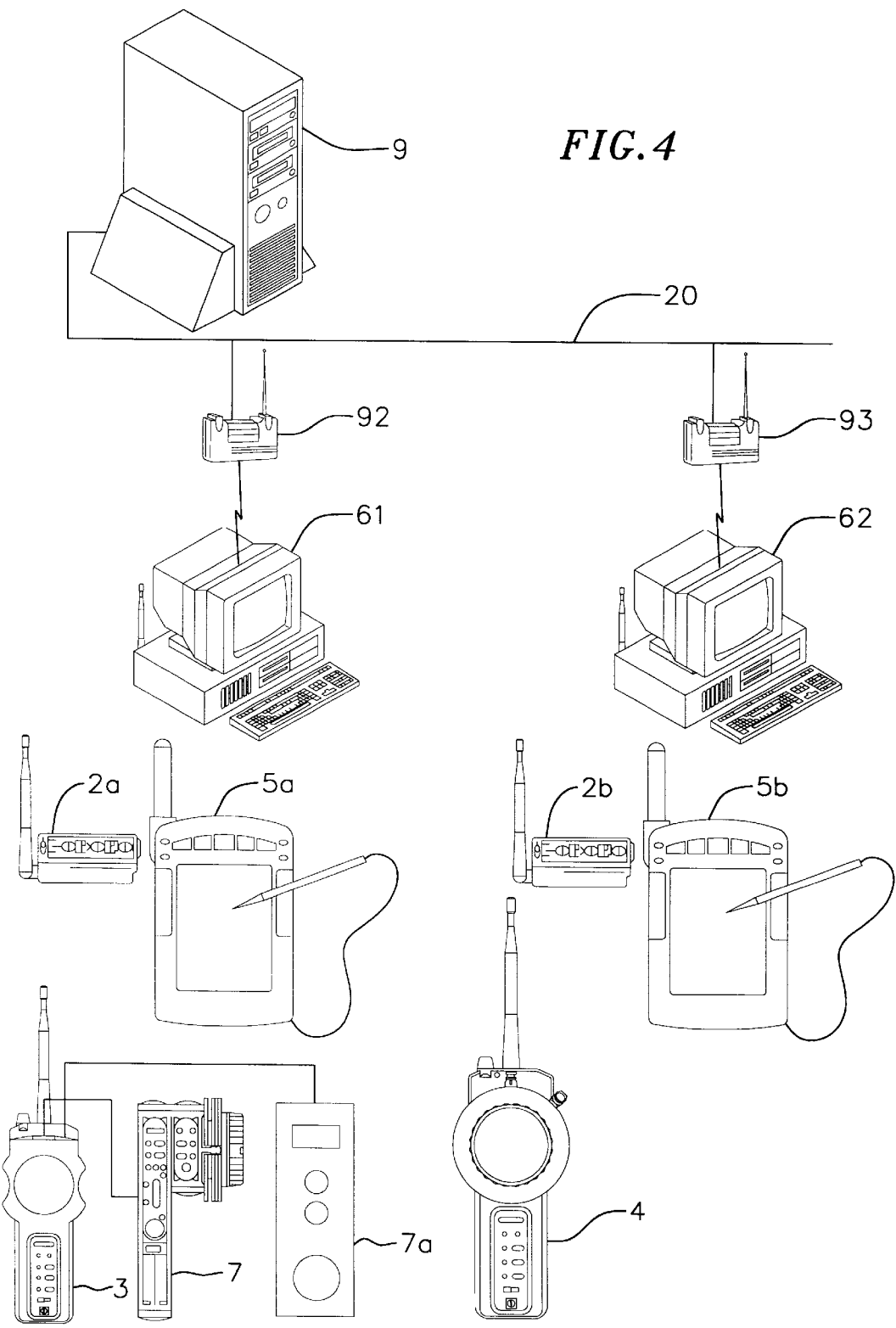
FIG. 4 shows a diagrammatic network construction with relevant work stations which are each connected to a network through a microwave transceiver.

FIGS. 3 and 4 show examples for incorporating the device for controlling, regulating and controlling cine cameras into a network.

FIG. 3 shows the connection of a central radio access point 91 with a control and data BUS 20 which is connected to a file server 9. The radio access point 91 sends and receives control commands and data from a control and detection unit 2 on the camera side as well as control units 4, 5 on the operator side and two work stations 61, 62. A superordinate control and monitoring device is thus provided which allows the co-ordination of different operator functions and can be used, for example, for setting operator hierarchies, which allows the central control and monitoring of different cine cameras and which, where applicable, can also be used to synchronize different cameras for recording one and the same scene.

Alternatively, FIG. 4 shows the arrangement of two radio access points 92, 93 which are each aligned with a radio frequency on the operator side so that they each send and receive only the transmission and receiving signals of the control units 3 on the operator side, in conjunction with cable remote control units 7, 7a, and control unit 5a; or the signals of control units 4, 5b, and the control and detection units 2a and 2b on the camera side, which are each associated with one cine camera.

FIGS. 5a and 5b show a control and detection unit 2 on the camera side which can be used both for radio operation and cable operation. The different drive units for the focus, zoom and iris adjustment are connected according to their function to the associated sockets 25, 26, 27, or alternatively, are connected to a five-pole BUS socket. Switches for reversing the pole of the running direction are provided directly adjacent the relevant motor connection socket. The camera and cassette functions can be input through an interface 29. The control and detection unit 2 is initiated with an ON/OFF switch 28. The signals are sent to and received from the control units through a microwave antenna 24.

Utilizing the network properties of the radio LAN technology makes it possible, in conjunction with a suitable operating software, to implement new functionalities and thus product features. Special mention should be made here of the possibility of a precise time coupling of camera slope functions with the displacement of the lens setting. Furthermore all memory functions such as are provided through the memory module option of a zoom motor unit, can be implemented in expanded form on radio PC's. The possibilities extend here to simple motion control systems. A forwarding of time code and scene data for administration functions can also be carried out without a direct connection of the lens control system to the camera.

FIGS. 6a, 6b, and 7 show two variations of a control unit 4 on the operator side which consist of an operating hand wheel 41 or two operating hand wheels 41, 42 for input of, for example zoom, iris and/or focus data, an input and display field 43 and an antenna 44. The control unit on the operator side is modular in construction and comprises the following modules: a controller, an operating hand wheel/hand wheels, a modem, a battery and a control system BUS adapter.

The controller is the central unit of the apparatus and contains a microprocessor control for reforming the setting data and BUS signals into a format which is suitable for radio transmission. In addition the data of an RS-232-channel can be added for transmission.

The modem module contains a radio data modem with matched connection to the controller.

The control system BUS adapter consists substantially of a distributor member with a lens control BUS and a camera control unit socket which provides several possibilities for fitting out a multi-axis operation and using lens control manual units which already exist. A zoom unit with or without a focusing unit as well as an apparatus compatible for the control of the camera functions, such as the remote control units 7, 7a, can be connected to the control system BUS adapter.

Furthermore, a second focusing knob can be attached so that a focus/iris main unit is provided without a zoom main unit being required. This configuration can also be connected, without the modem unit and battery, to the control and detection unit on the camera side through an existing five-pole lens-control BUS cable.

The operating functions and operating elements provided for the operating functions are designed analogous with the existing cable control units and expanded with operating elements for radio operation. This relates in particular to the preselection of one of three radio channels or bands which are available, which also allows the simultaneous operation of three radio sets at one film location.

FIG. 8 is a diagrammatic overall view of the information flow between the camera and lens system as well as the control unit on the operator side. The control unit 5 on the operator side, which in this embodiment is designed as a pen-based computer, contains a display unit 50 as well as an operator unit 51 which are connected to the cine camera 1 either without wires or through a cable. A lens 12 which can be coupled with two motor units 14, 15 for motorized adjustment can be connected to the lens connection of the cine camera 1.

The motor units 14, 15 receive from the lens 12 data on the focus setting, iris setting and lens coding, and in turn drive the adjustment devices of the lens. Furthermore, the motor units 14, 15 send out detection signals on the actual focus, the actual iris setting and the lens coding to the cine camera 1, and receive from the cine camera signals for the ideal focus and ideal iris setting.

Signals are sent from the cine camera 1, on the actual lens values and the actual camera values, to the display unit 50 of the control unit 5 on the operator side, and receive signals on the selected lens values, the selected camera values and calculated combination values, such as, for example, iris/image frequency, from the operator unit 51 of the control unit 5 on the operator side.

Figure 9:
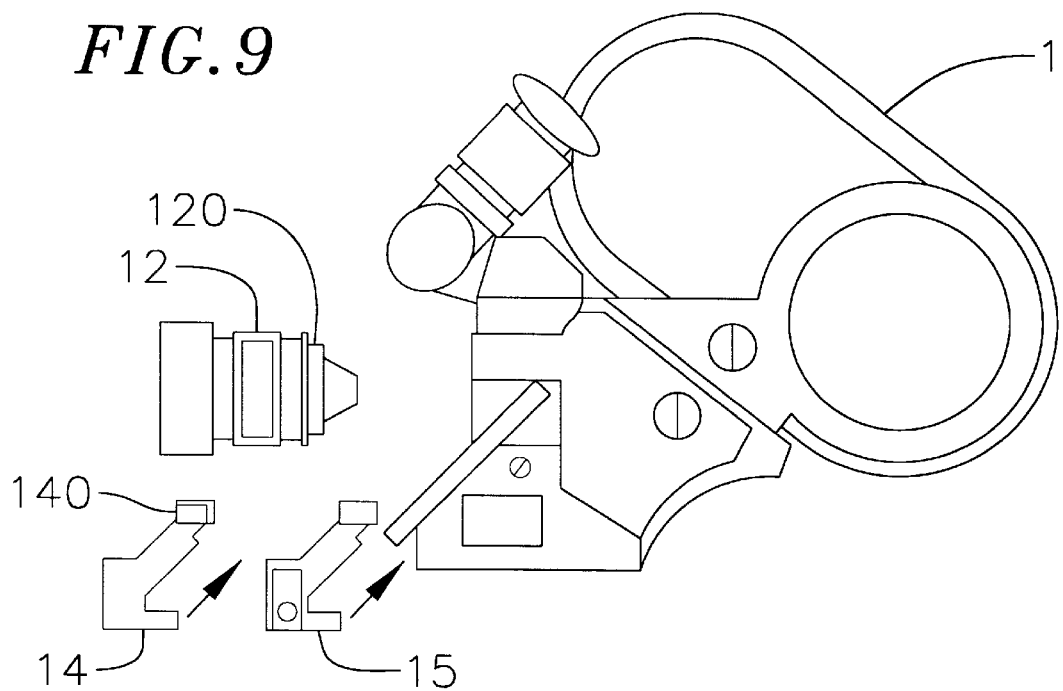
FIGS. 9 and 10 are diagrammatic illustrations of the individual components of the camera lens system according to FIG. 8.
Figure 10:
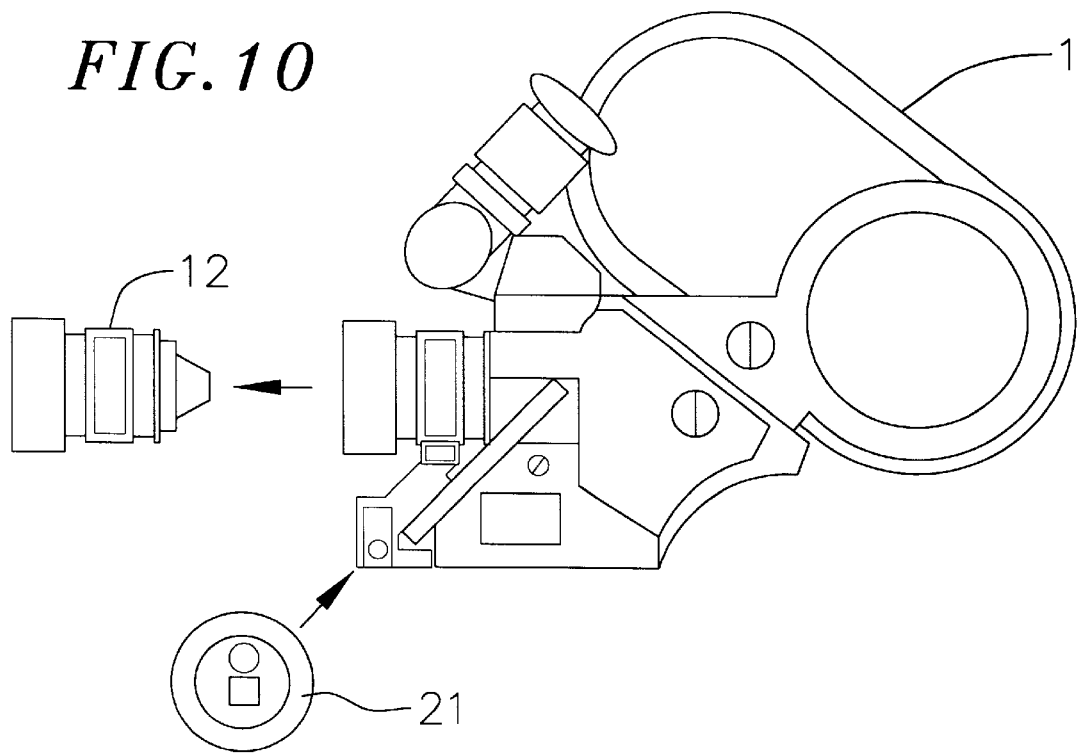

FIGS. 9 and 10 show an overall view of the components used for a camera/lens system. The camera lens 12 has coding discs for the optical setting values and selects a PL version which has no electrical interface between the lens and cine camera. The motor unit 14 contains a scanning of the coding discs and serves, for example, to set the focus of the lens 12. The second motor unit 15 serves for the iris setting and is, like the first motor unit 14, connected directly to the cine camera 1 and is fed from the battery on the camera side.

FIG. 10 shows diagrammatically the possibility of changing the lens without removing the motor unit as well as an optional possible connection for a direct manual operation with corresponding control unit 21.

Figure 11:
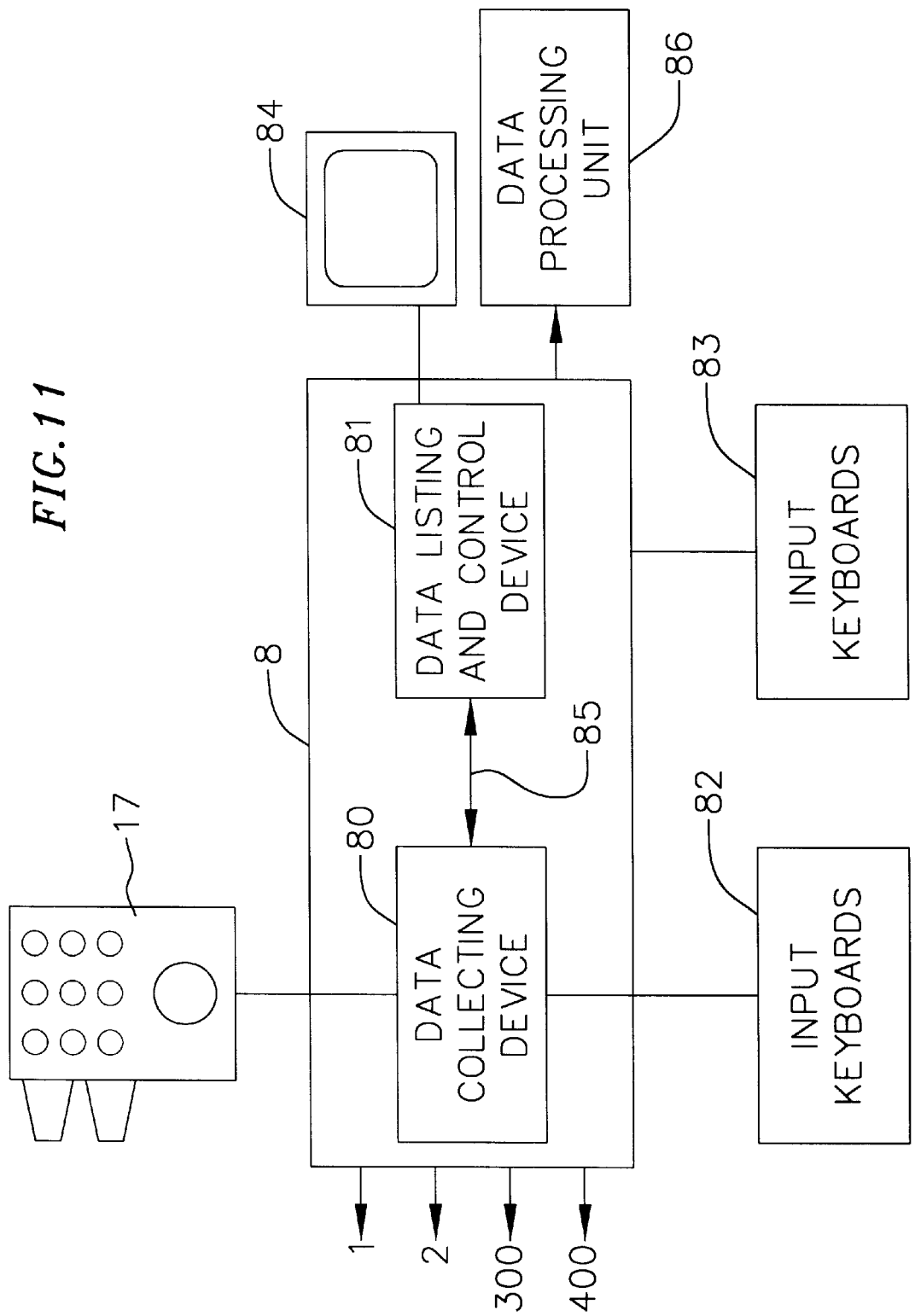
FIG. 11 is a diagrammatic block circuit diagram of a data listing and control system.

FIG. 11 shows an overall block circuit diagram of a data listing and control system 8 which is connected to different suitable components required for a film recording as well as to a display unit 84, input keyboards 82, 83 and units 86 (not shown in further detail) for processing the detected and, where applicable, stored data, and connected to a special marking unit 17. The data listing and control system 8 contains a data collecting device 80 as well as a data listing and control device (a computer) 81 which are connected together by a preferably bi-directional data and control lead 85. With a pure data listing operation, the data and control lead 85 would be a unidirectional lead. The data collected in the data collecting device 80 and the data which has been obtained from the various components of a film recording system, are sent to the data listing and control device 81 which stores, and where applicable, displays the collected data linked with a signal for the start of a recording sequence or links it to further input data.

Figure 12:
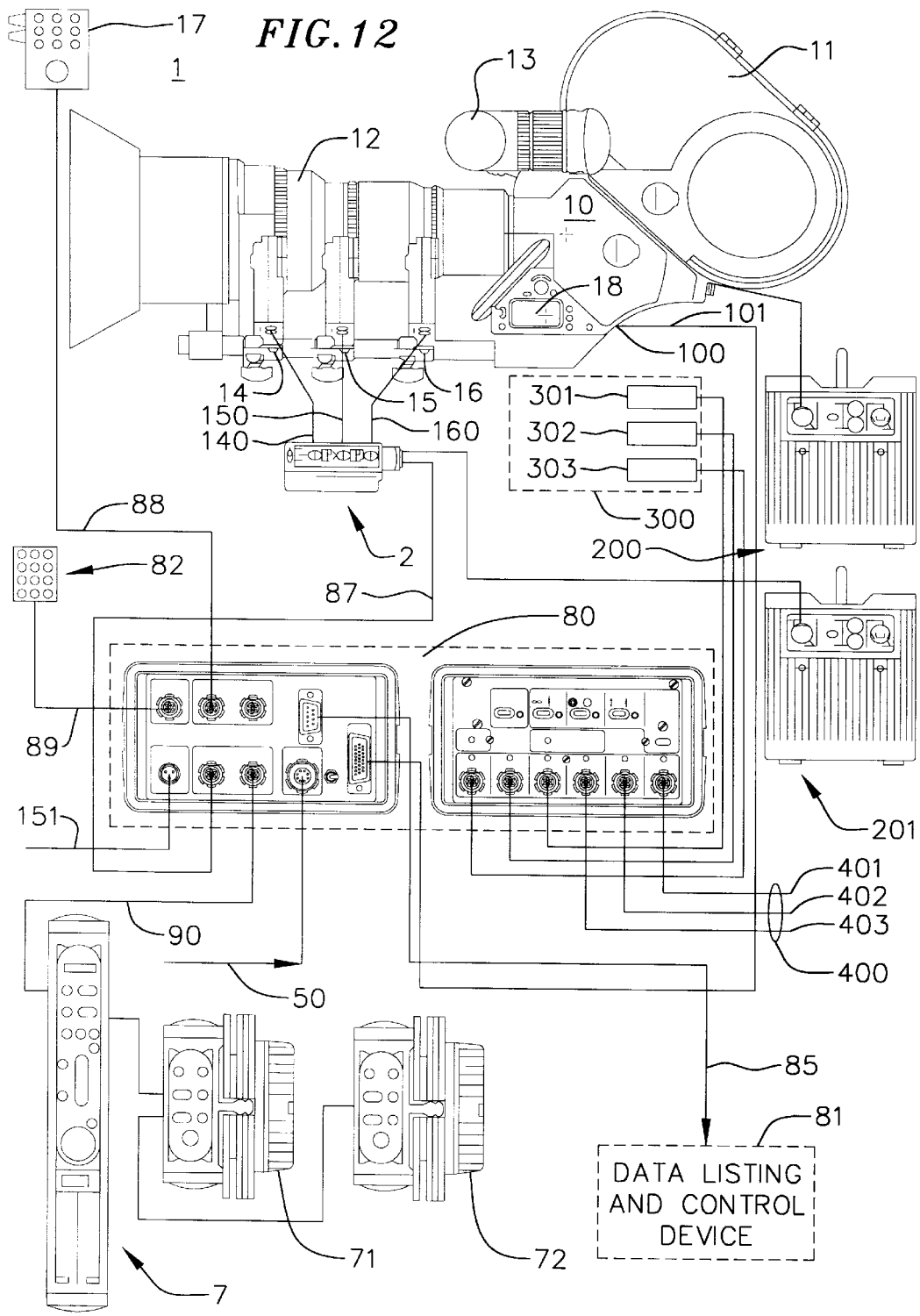
FIG. 12 is a detailed block circuit diagram of the data listing and control system according to FIG. 11.

FIG. 12 shows an embodiment for connecting a data listing and control system with a cine camera, several camera components, setting and operating units for the cine camera and camera accessories as well as other components, such as tripod head, camera trolley and the like.

Figure 13:
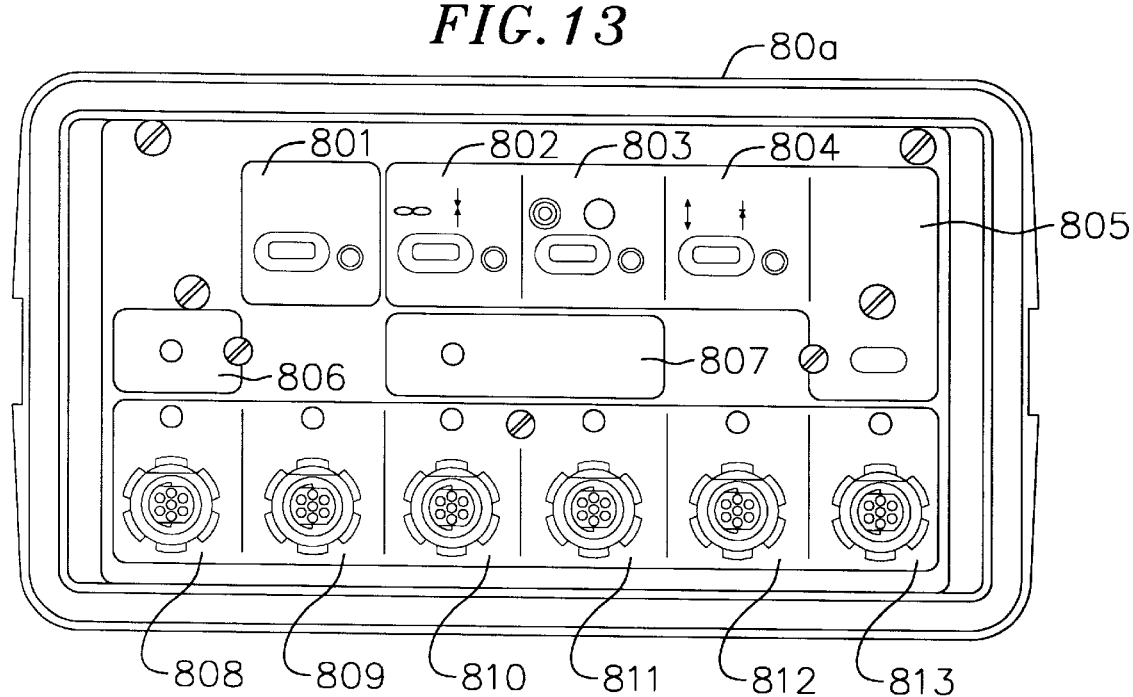
FIGS. 13 and 14 show views from the front and back of a universal data listing device.
Figure 14:
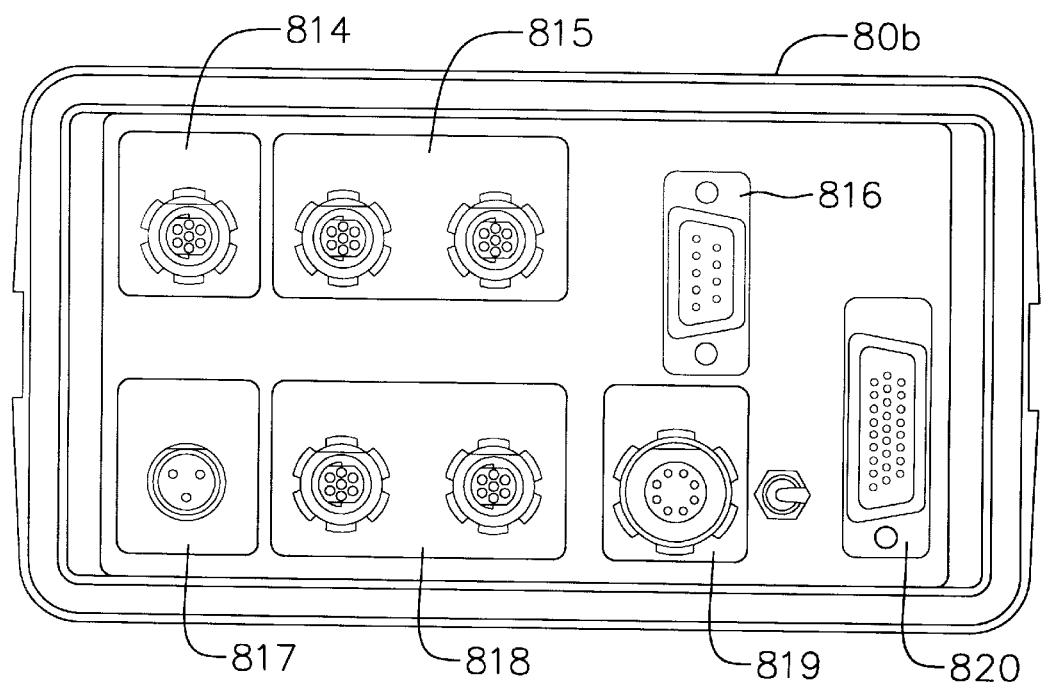

The data listing and control system consists of the embodiment shown in FIG. 12 of a data collecting device 80 with several front and back sockets, and operating elements, for which an embodiment is illustrated in FIGS. 13 and 14, and a data listing and control device 81, which is connected to the data collecting device 80 by a data and control lead 85. This data listing and control device 81 can preferably consist of a portable computer (notebook, laptop) or a fixedly installed computer.

Analogous with the embodiments described above, the cine camera 1 consisting of a camera housing 10 with a camera mechanism mounted therein for transporting the moving film, a rotating orbital aperture, where applicable, an iris diaphragm, a camera cassette 11, a camera lens 12, a camera viewfinder 13 and an operating field 18 for setting, storing and retrieving different camera functions, is provided with iris rods 19 on which are mounted a focus drive unit 14, a zoom drive unit 15 and an iris drive unit 16. Furthermore the cine camera 1 is connected to a camera battery 200.

A control and detection unit 2 on the camera side is connected through leads 140, 150, 160 to the focus drive unit 14, the zoom drive unit 15 and the iris drive unit 16, as well as to a further battery 201 and through a lead 87 to the data collecting device 80. A socket 100 on the camera side is attached through a lead 101 to the data collecting device 80 and the camera-specific data such as aperture setting, mechanism speed and cassette data are adapted and input to the data collecting device 80. Furthermore, the data collecting device 80 is connected to a position sensor 300 for a triple-axis tripod head from which sensor signals 301, 302, 303 for inclining, tilting and panning the tripod head are sent to the data collecting device 80. Similarly, the data collecting device 80 is connected to a position control and a detection unit (400) for a camera trolley. Sensor signals are supplied to the data collecting device via leads 401, 402, 403 from a camera trolley (dolly) and represent the rail position and height, as well as the type of camera trolley.

A setting and control unit 7 on the operator side and having hand wheels 71, 72 for the input of zoom, iris and/or focus data as well as, where applicable, an input and display field, is connected to the data collecting device 80 by the lead 90 so that this input data can also be detected and processed further. Further connections exist between the data collecting device 80 and a backup battery 51 through a lead 89 with an input keyboard 82, as well as through a lead 88 with a marking unit 17 which produces film-fixed markings, for example, at the start of a recording sequence.

In the illustrated embodiment the marking unit 17 consists of a unit which applies light markings to the moving film. However, analogous with this mechanical markings, can also be set at the beginning of a recording sequence which allow the data detected by the various units to be correlated with the relevant recording sequence by means of, for example, an image counter, i.e. the data can be stored when required synchronous with the picture.

FIG. 13 shows a view of the front side 80a of a data collecting device 80 with the various switch, display and connecting elements for connecting with the camera and accessory units shown diagrammatically in FIG. 12. The data collecting device 80 is activated by a switch 801 and the operating readiness is displayed. The switches 802, 803, 804 are used to undertake the detection, setting and compensation for the focus drive unit, the zoom drive unit and the iris drive unit. The function and rotary direction of the zoom, iris and focus drive unit can be tested by using a test button 805.

The activation of the marking unit 17 according to FIG. 12 is carried out through a display and switch unit 806 as well as the activation of the data detection through a switching and display element 807. Accessory parts such as a tripod head and a camera trolley for detecting the incline, tilt and pan angle of the tripod head as well as the setting, height and type of camera trolley are detected at the sockets 808 to 813.

The back 80b of the data collecting device 80 has a connection 814 for an input keyboard, connections 815 for the film marking unit, a connection 817 for the backup battery as well as connections 818 for the lens control units, a multi-pole connection 816 for the connection with the data detection and control device 81 according to FIG. 12, a connecting socket 819 for the input of a time code and a multi-pole connection 820 for the connection with the camera socket 100.

The data detected by the various units are synchronized and entered with the camera data, that is, synchronized with the film images of a film sequence. The actual values of the data are read and sent to the data detection and control device 81 for listing, further processing and sending signals to display devices. The listing of the data can thereby be selectively brought into connection with a time code applied to the moving film so that an association is made between the recording scene and genuine time.

By applying an optical mark on the film by means of the marking unit 17 the data recorded by the various units are correlated with the relevant film sequence and the corresponding data which have been linked together are listed in a data file. By retrieving the interlinked data or by deriving control signals from the interlinked data it is possible, for example, for setting up a virtual camera for 3D-animation to produce a link with the relevant animation which has a synchronized image and recording object. Then the virtual camera carries out, for example, exactly the same swivel action as the real recording camera. In this way special effects can easily be incorporated in the film by, for example, scanning the original image recorded with the real camera and superimposing the original image on the image in 3D animation. The combined image is then exposed onto the negative film by means of an exposure device.

The image synchronization is carried out by an image counter which, where applicable and with the presence of a time code device, is linked with same. By applying a film-fixed marking it is possible to associate each film image accordingly with the recording sequence by incrementing each film image starting from the film-fixed marking. The attachment of additional film-fixed markings can basically be omitted if the time code device is configured accordingly.

An essential advantage of the arrangement of the data collecting device 80, according to FIG. 12, consists in being able to remove, when required, the data collecting device 80 from the complete system so that even without the data collecting device the operation of the cine camera 1 with the complete accessories is guaranteed. The incorporation of a data collecting device 80 in connection with a data detection and control device 81 guarantees a more efficient production, while preserving the artistic freedoms of the operator, as well as a quick assembly. Further, the incorporation guarantees configuration of all the units as required by incorporating mobile units, without impairing the normal camera operation, and an image-synchronous storage of all the camera- and recording-specific data.

The data detection system supplies the user with the necessary functions for the automatic listing of data of the cine camera, the lens motors, the tripod head and camera trolley as well as for setting the various system configurations according to the requirements of a recording sequence. This function contains the device for marking the start of each individual recording sequence by controlling the exposure marking unit 17. The function of the data collecting device 80 also contains range setting and compensating functions for the lens setting units and the setting and resetting of starting positions of the tripod head and camera trolley path counter.

The system records image-related data of all recording components and sends the data in parallel or serially to the filing computer 81 which stores and classifies the data, and sends out control and display signals. Image counting information with time relations to time code data which are likewise detected at the start of each recording sequence are incorporated in the serial data flow. The data flow consists of a series of different types of information and is sent to the filing computer 81 during a recording sequence with a filing rate which depends on the recording speed of the cine camera. The start of filing is synchronous with the control impulse for the optical marking unit 17. The data listing is automatically terminated by the data collecting device when the speed of the cine camera drops, for example, below three images per second.

At the start of each film sequence, a film sequence mark is recorded by using the film-fixed optical marking together with the detected corresponding time code data and the image counter is set back to the value nil. The data collecting device 80 is controlled by means of the marking impulse after the high speed running of the cine camera and the data detection is status-synchronous with same. The optical marking unit 17 and the start of the data listing can be effected selectively manually by means of a button provided on the data collecting device or by a start signal sent out by the data detection and control device 81. Additionally there is the possibility of providing a remote control switch for the manual control. The optical marking signal is thereby likewise to be seen on a video playback.

The back-up voltage supply 51 serves to prevent the position counters of the tripod head 300 and camera trolley 400 in the data collecting device 80 from losing their calibration setting or basic setting in the event that the tripod head or camera trolley is moved while the power supply for the cine camera is not switched on and, consequently, the power supply for the data collecting device is also not active if this is obtained directly from the camera.

After sending out the marking impulse and the automatic start of the data detection and data transfer connected therewith, image data, recording sequence data, calibration data as well as the general system status are sent through the data and control lead 85, according to FIG. 12, to the data detection and control device 81.

At the end of the recording sequence, when the camera speed drops below three images per second, the data detection is automatically stopped. As an alternative here, individual threshold values can be provided for ending the data detection in order to utilize the entire speed range of the cine camera.

What is claimed is:

1. A device for controlling, regulating and monitoring a motion-picture camera having camera and recording functions, the device comprising:

camera devices controlling and detecting at least one of said camera and recording functions;

a control and data detection unit coupled to the camera devices for controlling said camera devices and receiving information from the camera device relating to the camera and recording functions, wherein the control and data detection unit comprises a bi-directional radio transmission and receiving unit; and a plurality of operation control units having a bi-directional radio transmission and receiving unit for transmitting signals to and for receiving signals from the bi-directional radio transmission and receiving unit of said control and data detection unit, wherein each of the plurality of operation control units receive control data input from an operator, transmit control signals in response to said data input to the control and data detection unit to control the camera devices for controlling the camera and recording functions, and receive control signals relating to the camera and recording functions from the control and data detection unit responsive to the received information; and wherein each of the plurality of operation control units is capable of being used simultaneously by individual operators at different locations.

2. A device for controlling, regulating and monitoring a motion-picture camera having camera and recording functions, and having camera devices for controlling and detecting at least one of the camera and recording functions, the device having a camera side and an operator side comprising:

a control and data detection unit on the camera side for coupling with the camera devices for controlling said camera devices and for receiving information from the camera devices relating to the camera and recording functions, wherein the control and data detection unit comprises a bi-directional radio transmission and receiving unit; and a plurality of operation control units on the operator side having a bi-directional radio transmission and receiving unit for transmitting signals to and for receiving signals from the bi-directional radio transmission and receiving unit of said control and data detection unit, wherein the plurality of operation control units receive control data input on the operator side, transmit control signals in response to said data input to the control and data detection unit on the camera side for controlling the camera devices for controlling and detecting at least one of the camera and recording functions, and receive control signals relating to the camera and recording functions from the control and data detection unit responsive to the received information; and wherein each of the plurality of operation control units is capable of being used simultaneously by individual operators at different locations.

3. The device according to claim 1 or 2 wherein at least one of the operation control units has a remote control and monitoring device, wherein the control and data detection unit is connected to an interface for connecting the control and data detection unit to a BUS cable which is connected to the remote control and monitoring device.

4. The device according to claim 1 or 2 wherein the plurality of operation control units are of modular construction and contain:

a) a LCS BUS adapter with a lens control system and camera control unit socket attaching at least one remote control unit controlling the camera functions and sending out BUS control signals;

b) a microprocessor-supported controller reforming the input control signals and BUS control signals into a format suitable for radio transmission; and c) a modem module with a data modem with matched connection to the microprocessor-supported controller.

5. The device according to claim 2 wherein the plurality of operation control units and the control and data detection unit each have a device selecting one of several radio bands.

6. The device according to claim 2 wherein one of the operation control units is a pen-based computer.

7. The device according to claim 2 wherein one of the operation control units is connected by a BUS adapter to at least one cable remote control unit.

8. The device according to claim 1 or 2 wherein the bi-directional radio transmission and receiving unit of the control and data detection unit, and the bi-directional radio transmission and receiving unit of each of the plurality of operation control units each further comprise a microwave transceiver.

9. The device according to claim 8 wherein the microwave transceivers utilize spread spectrum transmitting/receiving technology.

10. The device according to claim 8 wherein a protocol with an automatic CRC check is used in the microwave transceivers.

11. The device according to claim 1 wherein the control and data detection unit is connected to a device that is capable of at least one of producing and detecting a plurality of film-fixed markings, the device further comprising a data listing and control system connected to at least one of:
a) a socket on the motion-picture camera for at least one of detecting and controlling camera-specific settings;
b) the control and data detection unit;
c) at least one of the plurality of operation control units;
d) a position sensor for a tripod head;
e) a position control and a detection unit for a camera trolley;
f) the control device for producing the film-fixed markings;
g) an input keyboard;
h) a data security battery; and
i) an external time code signal provider.

12. The device according to claim 2 wherein at least one of the control and data detection unit and one of the operation control units has a micro computer protocolling camera-specific data.

13. The device according to claim 2 wherein the control and data detection unit is connected to a device that is capable of at least one of producing and detecting a plurality of film-fixed markings.

14. The device according to claim 13 further comprising a data listing and control system connected to at least one of:
a) a socket on the motion-picture camera for at least one of detecting and controlling camera-specific settings;
b) the control and data detection unit;
c) at least one of the plurality of operation control units;
d) a position sensor for a tripod head;
e) a position control and a detection unit for a camera trolley;
f) the control device for producing the film-fixed markings;
g) an input keyboard;
h) a data security battery; and
i) an external time code signal provider.

15. The device according to claim 14 wherein the data listing and control system further comprises a data detection and distribution device and a computer which stores the detected data and sends out control signals, the data detection and distribution device and the computer being linked together by a data and control lead.

* * * * *